Dec. 12, 1933.        J. VAN VULPEN        1,939,376
HEATING SYSTEM FOR MOTOR OPERATED CARS
Filed Dec. 13, 1929        2 Sheets-Sheet 1
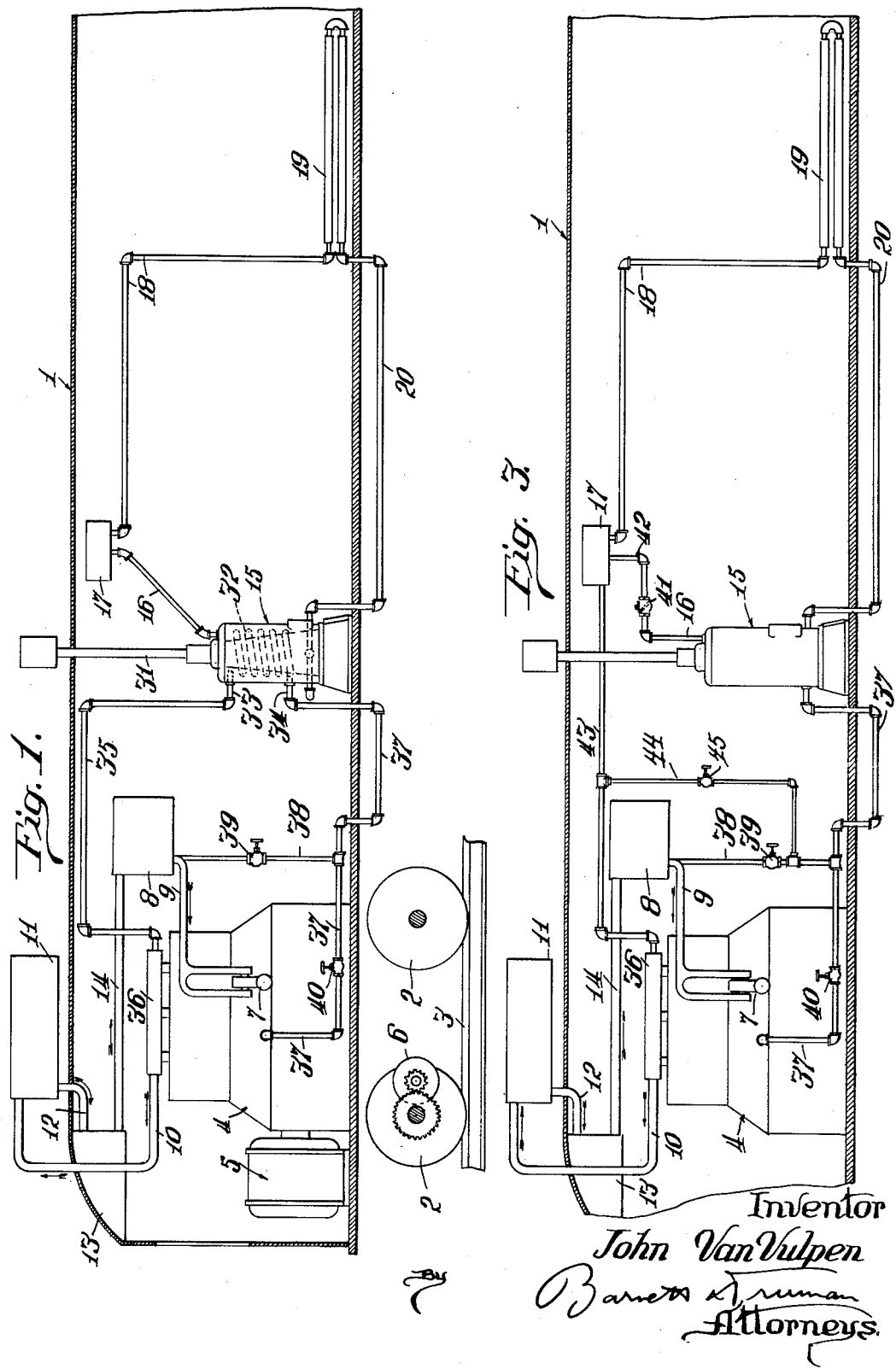
Inventor
John Van Vulpen
By Barnett & Truman
Attorneys.

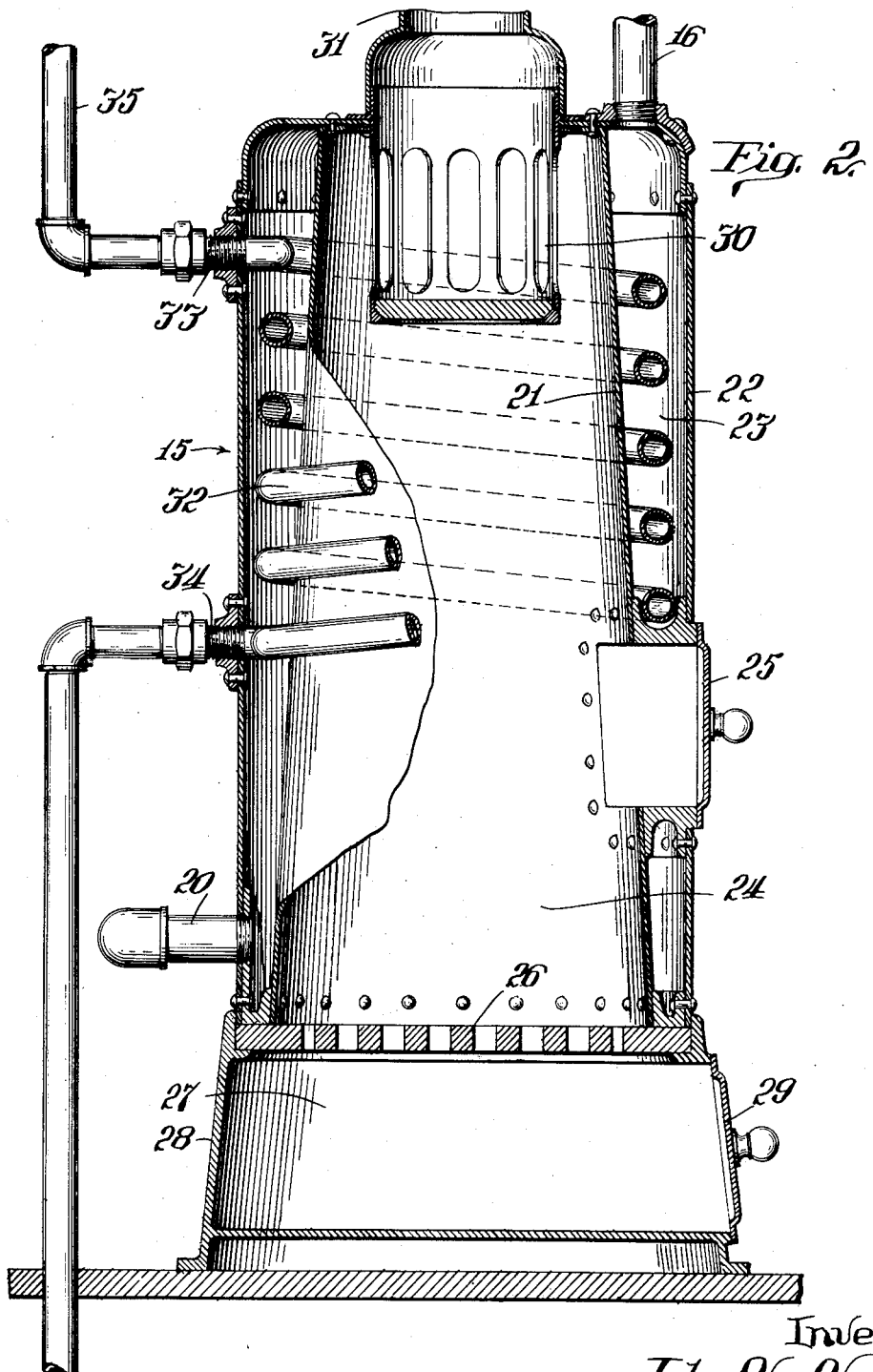

Patented Dec. 12, 1933

1,939,376

UNITED STATES PATENT OFFICE 1,939,376

HEATING SYSTEM FOR MOTOR OPERATED CARS

John Van Vulpen, Chicago, Ill., assignor to Vapor Car Heating Company, Inc., Chicago, Ill., a corporation of New York Application December 13, 1929
Serial No. 413,855

1 Claim. (Cl. 123—174)

This invention relates to certain new and useful improvements in a heating system for motor operated cars, and more particularly to an improved system whereby a portion of the heat usually dissipated from the cooling system of an internal combustion engine may be utilized to heat a closed car in which the engine is carried, or conversely heat generated in the car heating system may be imparted to the engine cooling system to prevent freezing thereof when the engine is not in operation or to facilitate starting of the engine.

Although there are numerous devices or situations to which the principles of this invention are applicable, the embodiments of the invention here disclosed were especially designed for use in self-propelled railway cars in which an internal combustion engine is carried by the car, usually for driving a dynamo which furnishes the power for driving the propulsion motors connected with the driving wheels. The internal combustion engine is provided with the usual cooling system comprising means for positively circulating water through the engine jacket and through a radiator positioned outside of the car and from which the heat generated in the engine is dissipated. A hot-water heating system is also provided within the car for heating the car in cold weather. This system comprises a heater formed with a fire-box and a water jacket, and one or more radiators, through which water heated in the water jacket is circulated. According to the present invention an auxiliary circulating system is associated with both the engine and the hot-water heater. When the engine is in operation, a portion of the heated liquid in the cooling system is circulated through the hot-water heater so as to transfer its heat to the car heating system. Alternatively, the liquid heated in the engine cooling system may be circulated directly through the radiators in the car. On the other hand, when the engine is out of service, the liquid in the auxiliary circulating system is heated by the hot-water heater and circulated through the engine so as to prevent freezing of the liquid in the cooling system and also to initially heat up the engine so that it may be more easily and efficiently started.

The principal object of the invention is to provide an improved apparatus of the type briefly described hereinabove, and disclosed more in detail in the specifications which follow.

Another object is to provide means for utilizing heat generated in an internal combustion engine for heating a closed compartment, the same means being used for transferring heat from another source to the engine when the engine is not in service.

Another object is to provide improved means for alternatively transferring heat from one heating device to another, as desired.

Another object is to provide an improved liquid circulating system associated with a pair of separate heating devices, whereby heat may be transferred through the circulating system from one heating device to the other in either direction.

Other objects and advantages will be more apparent from the following detailed description of certain approved forms of apparatus embodying the principles of this invention.

In the accompanying drawings:

Fig. 1 is a longitudinal vertical section through a portion of a railway car, in which the principal elements of the apparatus are diagrammatically illustrated.

Fig. 2 is a vertical section through the car-heater on a larger scale.

Fig. 3 is a sectional view, similar to Fig. 1, illustrating another form of the invention.

Referring first to Figs. 1 and 2, the railway car 1 is supported in the usual manner by the wheels 2 travelling on the rails 3. The internal combustion motor 4 carried within one compartment of the car drives the dynamo 5 which supplies power to the electric motors 6 for propelling the car.

The internal combustion engine 4 may be of any usual type and is provided with a cooling system comprising a pump 7 which withdraws water from a storage tank 8 through conduit 9 and forces this cooling water through the engine jackets. The water heated by the engine is forced out through pipe 10 to the radiator 11 positioned outside the car. This radiator 11 may be of any desired form having a maximum radiating surface exposed to the outer atmosphere and will usually be positioned on the roof of the car or at one end thereof. The water after being cooled within radiator 11, flows down through pipe 12 to a storage tank 13, from which it flows through pipe 14 to the main storage 8 previously described. By means of this system a continuous circulation of water is maintained through the engine cylinder jackets and the outside radiator 11.

For the purpose of heating the compartments within car 1 in cold weather, a hot-water heating system is provided. This system comprises a heater 15 from which hot water flows up through pipe 16 through the expansion tank 17, thence down through conduit 18 to one or more suitable car-heating radiating devices, such as indicated at 19, from which the cooled water flows back through pipe or conduit 20 to the heater 15.

The heater 15 may take a variety of forms, one improved embodiment being best illustrated in Fig. 2. The heater comprises an inner shell 21 and an outer shell 22 enclosing an annular water jacket 23 surrounding the fire-box 24, into which fuel is introduced through fuel door 25. The grate indicated at 26 separates fire-box 24 from the ash pit 27 in the base member 28 provided with the ash-pit door 29. The smoke flue 30 communicates with chimney 31 which extends out through the roof of car 1 (see Fig. 1). It will be apparent that the fires within the heater will heat the water in jacket 23, the hot water flowing out from the top of the jacket through outlet pipe 16 to the radiators, and the cooled water flowing back through inlet pipe 20 communicating with the lower portion of jacket 18.

A pipe coil 32 is positioned within the water jacket 18, the ends of the coil extending out through the outer shell 22, as indicated at 33 and 34, so that the fluid circulating within coil 32 is kept from direct contact or intermixture with the fluid within jacket 23. A pipe 35 extends from the upper manifold 36 of the engine cooling system to the upper end 33 of coil 32. A pipe 37 extends from the lower end 34 of this coil into the lower portion of the cooling jackets of engine 4. A branch pipe 38 extends from pipe 37 upwardly into the storage tank 8. A valve 39 is provided in branch pipe 38, and a similar cut-off valve 40 is provided in the pipe 37 between the inlet of pipe 38 and the engine water jacket.

When the engine 4 is in operation, valve 40 will be closed to prevent water being forced by the pump pressure through pipe 37 and valve 39 opened. A portion of the cooling liquid heated by the engine will be circulated through the outside radiator 11, whereby the heat is dissipated. Another portion of this heated liquid will be circulated from manifold 36 through pipe 35, coil 32, pipe 37, pipe 38, tank 8, pipe 9, and pump 7, back to the engine. The heated liquid passing through coil 32 will transfer its heat to the water in jacket 23 of the hot-water heating system. The heat thus imparted to this circulating system may be sufficient to heat the car to the desired temperature, if not, a fire may be maintained in the heater 15 to further raise the temperature of the water in water-jacket 23 so that the desired temperature may be maintained within the car compartments by means of the radiator or radiators 19.

When the car is out of service and engine 4 is not operating, the car is heated in the usual manner by maintaining a fire in the heater 15 so as to heat the water within jacket 23 and maintain a circulation of hot water through the car radiator 19. At this time the valve 40 will be opened and the valve 39 closed. The liquid in coil 32 will also be heated by the fire maintained in heater 15 and this liquid will flow out through pipe 35, thence through the manifold 36 and engine jackets and back through pipe 37 to the coil 32. This will serve to raise the temperature of the water within the engine so that there is no possibility of freezing and the engine will be more easily started. The engine jacket and the storage tanks 13 and 8 have sufficient capacity to hold all of the water in the cooling system of the engine so that when the pump 7 is not in operation the water in radiator 11 will drain down into the tanks within the car. This will prevent water from freezing in the exposed radiator. The temperature within the car will prevent the water in tanks 13 and 8 from freezing and the temperature of the water in these tanks will also be raised by conduction of heat from the water in the engine jacket, now heated from coil 32. It will thus be seen that the intermediate circulation system comprising pipes 35 and 37 and coil 32 provides a means whereby heat may be transferred either from heater 15 to the engine, or from the engine to heater 15, as circumstances may require. This heat is also transferred to the separate water circulation system associated with either the heater 15 or the engine 4. Heat generated in the internal combustion engine 4 and formerly wasted is utilized for heating the car, and the same means is used for raising the temperature of the engine cooling system, when the engine is out of operation, by heat transferred from the car-heating system.

It will be noted that in this first described form of the invention, the water-circulating systems of the heating system and the engine-cooling system are maintained entirely distinct from one another. In the modified form disclosed in Fig. 3, the water heated in the engine cooling system is circulated directly through the radiating system employed for heating the car. The main engine cooling system is substantially the same as in the first described form of the invention and the parts are indicated by the same reference characters. The hot-water heating system is substantially the same as in the first described form of the invention, with the addition of a check valve 41 positioned in the pipe 42 leading from heater 15 to the expansion tank 17. This valve 41 will not permit the return flow of water from tank 17 to the water-jacket of the heater 15. There is no auxiliary coil within the water jacket of heater 15, and the conduit 37 leads directly from the lower portion of this water jacket back to the engine. A pipe 43 leads from the manifold 36 of the engine into the expansion tank 17 of the heater system. As before, valve 40 will be closed and valve 39 opened when the engine is in operation. At this time heated water from manifold 36 will flow through pipe 43 to expansion tank 17 and thence through the radiating system within the car back to the water jacket of heater 15, from which it flows from pipes 37 and 38 to tank 8 and thence back into the engine cooling system. If necessary, the heater 15 may be utilized to further raise the temperature of this circulating water. The heater 15 will then act as a "booster" to supplement the heat imparted to the heating system by the internal combustion engine. When the engine is out of service, valve 40 will be opened and valve 39 closed. When the fires are built in heater 15 to circulate hot water through the car radiators 19, a portion of this heated liquid will be diverted from expansion tank 17 through pipe 43 and the engine jackets and thence back through pipe 37 to the water jacket of heater 15, all as in the first described modification. In this latter form of the invention, it is not contemplated that the heater 15 will ordinarily be used when the engine is in operation. When the engine is out of service, the heater 15 is used to supply heat to the car heating system and also to prevent freezing of the liquid in the engine cooling system. A small by-pass pipe 44 provided with a valve 45 may be connected between pipes 43 and 38 to prevent the accumulation of steam or air in dormant loops of the circulating systems, and to maintain a slight circulation as a protection against freezing.

Each of the circulating systems can be divided into two or more parallel circulating systems if desired, and each controlled at will by suitable valves.

I claim:

In combination with a railway car an internal combustion engine and a cooling system therefor including an engine jacket, a radiator outside the car for the engine jacket, a storage tank within the car, and a pump between the storage tank and engine jacket for circulating water through the engine jacket and from the upper portion of the engine jacket through the radiator and tank and back into the lower portion of the engine jacket, a hot-water system for heating the car, said system including a water jacket of a heater, means for heating the water jacket, a car radiator and conduits for circulating heated water from the water jacket to and through the car radiator and back to the water jacket, a coil in the water jacket, a conduit leading from the upper outlet of the engine jacket to the upper end of the coil, a conduit leading from the lower end of the coil and having branches leading respectively to the storage tank and to the lower portion of the engine jacket, and cut-off valves in each branch of the latter conduit.

JOHN VAN VULPEN.